United States Patent Office 2,979,407
Patented Apr. 11, 1961

2,979,407

BLOOM INHIBITED CHOCOLATE AND METHOD OF PRODUCING SAME

William N. Duck, Manor Township, Lancaster County, Pa. (607 Capri Road, Lancaster, Pa.)

No Drawing. Filed May 28, 1959, Ser. No. 816,373

5 Claims. (Cl. 99—23)

This invention relates to solid chocolate materials and chocolate coated products. More particularly it relates to confectionery chocolate suitable for the preparation of bars, enrobing, icings, and the like.

It is the principal object of the present invention to produce a chocolate which is color stable upon storage.

It is another object of the present invention to provide a process of treating chocolate for use as a candy confection or in the preparation of edible products such as candy confections and chocolate coated desserts which is stabilized against discoloration.

It is a further object of the present invention to provide an edible chocolate stabilized against discoloration or physical properties from the conventional confectionery materials in commerical usage.

Other objects and advantageous features of the invention will be apparent from the description and claims.

The discoloration of solid chocolate materials during storage is a matter of common experience. Chocolate bars and certain chocolate enrobed confections tend to fade and/or change in color under certain conditions of storage and composition. The phenomenon is known to the trade as "bloom." It may be a "low temperature bloom" which is a gray to light brown hue, or a more pronounced, very tan discoloration known as "high temperature bloom" which occurs under extreme temperature variations rendering the chocolate "heat struck." It is a cause of considerable financial loss and embarrassment among manufacturers of such materials. Contrary to popular opinion, "bloom" is not necessarily associated with "staleness." For instance, it has been found that temperature cycling and certain ingredient proportions are factors conducive to "bloom" formation. Thus, a product supplied to a retail merchant in a fresh and wholesome condition is often found to be so faded that its unpalatable appearance makes it unsuitable for sale.

The physical or chemical nature of the change which accompanies this unsightly phenomenon is not known. The taste and technical requirements of the industry preclude any substantial modifications of the chocolate compositions as currently employed. For instance, such a manufacturing process as enrobing is highly sensitive to the melting point and viscosity properties. Furthermore, foreign tastes must be avoided and the characteristic chocolate flavor must be preserved to the satisfaction of the consuming public.

In accordance with the present invention it has been discovered that by the incorporation of minor amounts of certain materials to be described hereinafter within a chocolate product, the tendency to "gray" or "bloom" is greatly reduced without any other noticeable effect upon the appearance or taste of the unstabilized material.

The term "chocolate product" as employed in this application is intended to include the solid or semiplastic food prepared by finely grinding cacao nibs and compositions wherein this material is an essential ingredient. Thus, within the expression is included such material commonly known as "chocolate liquor," "chocolate," "bitter chocolate," "baking chocolate," "cooking chocolate," "chocolate coating" and "bitter chocolate coating;" the alkali treated cacao products known as "Dutch chocolate"; chocolate saccharine compositions known as "sweet chocolate" or "sweet chocolate coating"; bittersweet chocolate," "bittersweet chocolate coating," "semi-sweet chocolate" or "semi-sweet chocolate coating" wherein the saccharine ingredient may be sucrose, dextrose, dried corn syrup and the like; and the chocolate liquor, milk solids, saccharine compositions commonly known as "milk chocolate," "sweet milk chocolate," "milk chocolate coating," "sweet milk chocolate coating," "skim milk chocolate," "buttermilk chocolate" and "mixed dairy product chocolates." Furthermore, compositions made from sweet chocolate or cocoa and fats other than cacao fat are intended by the generic term. In these latter compositions the cacao fat is replaced in part by one or a mixture of two or more vegetable food oils or fats other than cacao fat, which may be hardened or hydrogenated. Such coatings are employed primarily to obtain variations in melting point.

The chocolate and chocolate compositions as described above may contain additives as spice, ground vanilla beans, any natural food flavoring oil, oleoresin or extract, vanillin, ethyl vanillin, coumarin, or other artificial food flavoring, butter, milk fat, dried malted cereal extract, ground coffee, ground or whole nut meats, salt, and viscosity modifiers such as lecithin.

The stabilizing ingredient which is incorporated within the chocolate composition in accordance with this invention is a mixture of triglyceride esters of fatty acids. The fatty acids of these esters are primarily lauric, myristic and palmitic acids obtaintable from any of a number of natural fats. The preferred ratio of fatty acids is 2.0 moles of lauric acid, 1.2 moles of myristic acid and 2.0 moles of palmitic acid. However, each component may vary 10% plus or minus the moles given and the presence of minor amounts of other fatty acids in the stabilizing ingredient does not change the basic character of the stabilizing ingredient or of this invention.

The stabilizing ingredient may be produced in any of a number of ways. The three fatty acids in the ratio given may be reacted by heating with the proper amount of glycerine and a suitable catalyst such as stannous chloride dihydrate, as the first step. The second step consists of purification of the mixture resulting from the first step by fractional crystallization from a solvent carried out as follows:

The material resulting from the first step is dissolved in a suitable solvent such as acetone using one part of the fat to 15 to 25 parts of solvent. This mixture is chilled at 32° F. (0° C.) with the result that a solid fat crystallizes from the solvent fat mixture. This solid fat crystalline material, separated from the liquid which is heated to drive off the solvent, is the stabilizing ingredient. It may be further purified by bleaching and deodorizing as is usual for edible oils.

The first step may also consist of mixing coconut oil with tripalmitin in proper proportions so that the ratio of lauric, myristic and palmitic acids is obtained, as given previously, adding a suitable interesterification catalyst, such as stannous chloride dihydrate to rearrange the acids and heating to promote the reaction. The resulting reacted mixture is treated by the second step as previously stated.

For the initial step other fats may be used, for example, palm kernel oil and other vegetable butter types of oils with the proper ratio of lauric and myristic acids in place of coconut oil, or mixtures of several oils or fats may be used to the same ends. Palmitic acid and glycerine may be used in place of tripalmitin. Purification of the reaction mixtures from any of these combinations is carried out by the second step.

The triglyceride mixture which results from any of the methods given is the stabilizing ingredient and is a hard fat at room temperature containing primarily lauric, myristic and palmitic acids at or near the ratios of these acids at the start of the reaction. The melting point of the stabilizing material is within the range of 40° C. to 48° C. (104° F. to 118° F.).

The concentration of the stabilizing ingredient in chocolate may be as high as 5%, should not be below about 0.5%, but the preferred concentration is 2.5% based on the weight of the coating or bar chocolate.

In the preparation of the chocolate composition, a solid chocolate of conventional commercial origin is melted and the stabilizing ingredient added in melted form with constant stirring. The mass is tempered, following usual procedures, and then used for dipping or coating of centers or cast into bars.

The following example is given to illustrate the invention, but is not intended to limit it in any way.

The stabilizing ingredient was added to a melted conventional commercial chocolate coating so that the resulting composition contained 2.5% of the stabilizing ingredient. The molten mass was stirred at 29° C. until a slight rise in viscosity showed that some of the fat had begun to crystallize. A part of this chocolate mass was used to coat crystallized sugar and caramel centers by dipping them into the chocolate and cooling them. Part of the chocolate mass was also cast into bars. The coated pieces and bars were then stored under temperature cycle conditions, 12 hours at 68° F. and 12 hours at 86° F. until the appearance of bloom. These pieces, constituted as just referred to, resisted bloom formation for 60 days. Control samples, produced in the same way from the same chocolate except that there was none of the stabilizing ingredient present, showed bloom formation in seven or ten days.

Many modifications that do not depart from the above disclosed invention will be apparent to one skilled in the art. Thus other additives may be present to alter or control test and/or viscosity also.

I claim:

1. A bloom inhibited chocolate product comprising a major portion of edible chocolate and a minor portion of from 0.5% to 5% by weight of a stabilizing material, said stabilizing material comprising a mixture of triglyceride esters based on the ratio of 2 moles of lauric acid, 1.2 moles of myristic acid, and 2 moles of palmitic acid, the stabilizing material having a melting point in the range from 104° F. to 118° F.

2. A composition of matter comprising a major portion of edible chocolate and a minor portion of an edible stabilizing material, said stabilizing material comprising a mixture of triglycerides based on the reaction of 2 moles of lauric acid, 1.2 moles of myristic acid and 2 moles of palmitic acid with glycerol and the said stabilizing material being the fraction recovered from such reactions which has a melting point in the range of 104° F. to 118° F.

3. A composition of matter comprising a major portion of edible chocolate and a minor portion of edible stabilizing material, said stabilizing material comprising a mixture of triglycerides based on the reaction product from the reaction with glycerol of 2 moles of lauric acid, 1.2 moles of myristic acid and 2 moles of palmitic acid and the subsequent recovery of the said stabilizing material as the fraction with a melting point in the range of 104° F. to 118° F.; the stabilizing material being a part of the composition of matter in the range below 5% by weight.

4. The method of producing bloom inhibited chocolate products which comprises adding to molten chocolate 0.5 to 5.0% by weight of a stabilizing ingredient in molten form with stirring, said stabilizing ingredient comprising a triglyceride reaction product from the reaction of mixtures with ratios of 2 moles of lauric acid, 1.2 moles of myristic acid and 2 moles of palmitic acid, the triglyceride reaction product being the fraction recovered with a melting point in the range of 104° F. to 118° F.

5. The method of producing bloom inhibited chocolate products which comprises adding to molten chocolate 0.5 to 5% by weight of a stabilizing agent, said stabilizing agent being the reaction product based on the reaction of 2 moles of lauric acid, 1.2 moles of myristic acid and 2 moles of palmitic acid with glycerol and the said stabilizing material being the fraction recovered from such reactions which has a melting point in the range of 104° F. to 118° F.

References Cited in the file of this patent

UNITED STATES PATENTS

| 2,188,489 | Veatch | Jan. 30, 1940 |

FOREIGN PATENTS

| 692,365 | Great Britain | June 3, 1953 |
| 214,114 | Australia | Sept. 13, 1956 |